(12) United States Patent
Kim

(10) Patent No.: US 12,463,193 B2
(45) Date of Patent: Nov. 4, 2025

(54) MANUFACTURING METHOD OF ELECTRODE FOR SECONDARY BATTERY, MANUFACTURING APPARATUS THEREOF AND ELECTRODE FOR SECONDARY BATTERY

(71) Applicant: SK On Co., Ltd., Seoul (KR)

(72) Inventor: Ju Hyun Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/334,377

(22) Filed: Jun. 14, 2023

(65) Prior Publication Data

US 2023/0420632 A1 Dec. 28, 2023

(30) Foreign Application Priority Data

Jun. 24, 2022 (KR) .................. 10-2022-0077695

(51) Int. Cl.
*H01M 4/04* (2006.01)
*F26B 21/00* (2006.01)

(52) U.S. Cl.
CPC ....... *H01M 4/0404* (2013.01); *H01M 4/0409* (2013.01); *H01M 4/0471* (2013.01); *F26B 21/004* (2013.01)

(58) Field of Classification Search
None
See application file for complete search history.

(56) References Cited

U.S. PATENT DOCUMENTS

| | | | |
|---|---|---|---|
| 6,204,483 B1 * | 3/2001 | Fair | C03B 35/16 |
| | | | 219/486 |
| 2006/0226123 A1 * | 10/2006 | Birang | B24B 49/105 |
| | | | 438/692 |

FOREIGN PATENT DOCUMENTS

| | | | |
|---|---|---|---|
| CN | 107946539 A | | 4/2018 |
| JP | 2019163903 A | * | 9/2019 |
| KR | 10-1145840 B1 | | 5/2012 |
| KR | 10-1477870 B1 | | 12/2014 |
| KR | 10-2170893 B1 | | 10/2020 |
| KR | 10-2234707 B1 | | 4/2021 |
| KR | 20220030751 A | | 3/2022 |
| KR | 10-2022-0067839 A | | 5/2022 |

OTHER PUBLICATIONS

English translation of JP2019163903.*
English translation of KR20220030751.*
Extended European Search Report for the European Patent Application No. 23180483.2 issued by the European Patent Office on Dec. 12, 2023.
Office Action for Korean Patent Application No. 10-2022-0077695 issued by the Korean Patent Office on Jan. 13, 2025.

* cited by examiner

*Primary Examiner* — Charles Capozzi
(74) *Attorney, Agent, or Firm* — IP & T GROUP LLP (57) ABSTRACT

Provided is a manufacturing method of an electrode for secondary battery, the method comprising: forming a coating layer on a current collector; obtaining an offset value representing a height difference in the width direction of the coating layer; moving a shielding device to a position where the offset value is less than a reference value; and drying the coating layer.

5 Claims, 7 Drawing Sheets

MANUFACTURING METHOD OF ELECTRODE FOR SECONDARY BATTERY, MANUFACTURING APPARATUS THEREOF AND ELECTRODE FOR SECONDARY BATTERY

CROSS-REFERENCE TO RELATED PATENT APPLICATION

The present application claims priority under 35 U.S.C. § 119(a) to Korean patent application number 10-2022-0077695 filed on Jun. 24, 2022, in the Korean Intellectual Property Office, the entire disclosure of which is incorporated by reference herein.

BACKGROUND OF THE INVENTION

1. Field

The present disclosure relates to a secondary battery, more specifically, a manufacturing method of an electrode for secondary battery, a manufacturing apparatus thereof, and an electrode for secondary battery.

2. Description of the Related Art

Recently, the demand for secondary battery is drastically increasing as an energy power source. Secondary battery refers to a battery that is reusable through charging. Secondary batteries may comprise electrodes. An electrode may be manufactured by applying a slurry onto a current collector and then performing a drying process.

In a drying process of an electrode, a difference in drying speed may occur between a side area and a central area of the electrode. This is because the amount of the slurry applied to the side area is smaller than that of the central area so that the solvent of the slurry to be evaporated per unit time is small. In addition, this is because the flow of hot air is concentrated in the side area of the electrode and the amount of heat transferred to the side area is greater than that in the central area.

Due to such a difference in the drying speed and the Coanda effect of a nozzle, cracks are generated on the electrode as the electrode is folded or bent. In particular, a secondary battery comprising a cracked electrode may cause a fire due to the deterioration of charge capacity or a damage to a separator. A method for solving these problems is required.

SUMMARY OF THE INVENTION

The purpose of the present disclosure is to provide a manufacturing method of an electrode for secondary battery, a manufacturing apparatus thereof, and an electrode for secondary battery for preventing a defect of an electrode.

According to one Example of the present disclosure, a manufacturing method of an electrode for secondary battery may comprise: forming a coating layer on a current collector; obtaining an offset value representing a height difference in the width direction of the coating layer; moving a shielding device to a position where the offset value is less than a reference value; and drying the coating layer.

In one Example, in moving a shielding device, a shielding device may be moved along a guide rail so that the shielding device may shield a side area of a selected nozzle corresponding to a position where an offset value is less than a reference value among a plurality of nozzles disposed in a horizontal direction.

In one Example, in drying the coating layer, while the shielding device shields a side area of a selected nozzle, a coating layer may be dried by hot air supplied through each of nozzles other than the selected nozzle among a plurality of nozzles and by hot air supplied through a central area of the selected nozzle.

In one Example, the manufacturing method comprises, while drying a coating layer, obtaining an offset value and moving a shielding device to a position where the offset value is less than a reference value.

In one Example, obtaining an offset value may comprise measuring the height of a coating layer through a height sensor and obtaining an offset value based on the average height of a central area and the average height of a side area.

In one Example, in the obtaining an offset value, a ratio value or a difference value between the average height of a central area and the average height of a side area may be obtained as an offset value.

In one Example, measuring the height of a coating layer may comprise outputting light to a coating layer by an output portion of a height sensor; receiving light by a receiving portion of a height sensor; and determining a value corresponding to a position of the light received by the receiving portion as the height of the coating layer.

In one Example, a coating layer may comprise a solvent, an active material, a conductive material, and a binder.

According to one Example of the present disclosure, an electrode for secondary battery manufactured according to the manufacturing method for an electrode for secondary battery may be provided.

According to one Example of the present disclosure, a manufacturing apparatus for secondary battery may comprise a plurality of nozzles for supplying hot air to an electrode comprising a current collector and a coating layer formed on the current collector; a height sensor obtaining an offset value representing a height difference of the coating layer in the width direction; and a shielding device moving, along a guide rail, to a position where the offset value is less than a reference value.

In one Example, a shielding device may shield a side area of a selected nozzle corresponding to a position where the offset value is less than a reference value among a plurality of nozzles.

In one Example, a height sensor may reobtain an offset value while drying a coating layer and may move, along a guide rail, to a position where the reobtained offset value is less than a reference value.

In one Example, a plurality of nozzles may be disposed along a horizontal direction under or above an electrode, and a shielding device may move between the plurality of nozzles and the electrode.

In one Example, the height sensor may measure the height of a coating layer and obtain an offset value based on the average height of a central area and the average height of a side area.

In one Example, the height sensor may obtain a ratio value or a difference value between the average height of a central area and the average height of a side area as an offset value.

According to an Example of the present disclosure, the present disclosure may provide a manufacturing method for an electrode for secondary battery, a manufacturing apparatus thereof, and an electrode for secondary battery for preventing a defect of an electrode.

The present disclosure can reduce the difference in drying speed between a side area and a central area of an electrode. The present disclosure can control the amount of heat transferred for each area. The present disclosure can increase the manufacturing yield of electrodes for secondary battery.

DETAILED DESCRIPTION

Structural or functional descriptions of Examples disclosed in the present specification or application are merely illustrated for the purpose of describing Examples according to the technical principle of the present disclosure. In addition, Examples according to the technical principle of the present disclosure may be implemented in various forms other than the Examples disclosed in the present specification or application. In addition, the technical principle of the present disclosure is not to be construed as being limited to the Examples described in this specification or application.

Figure 1:
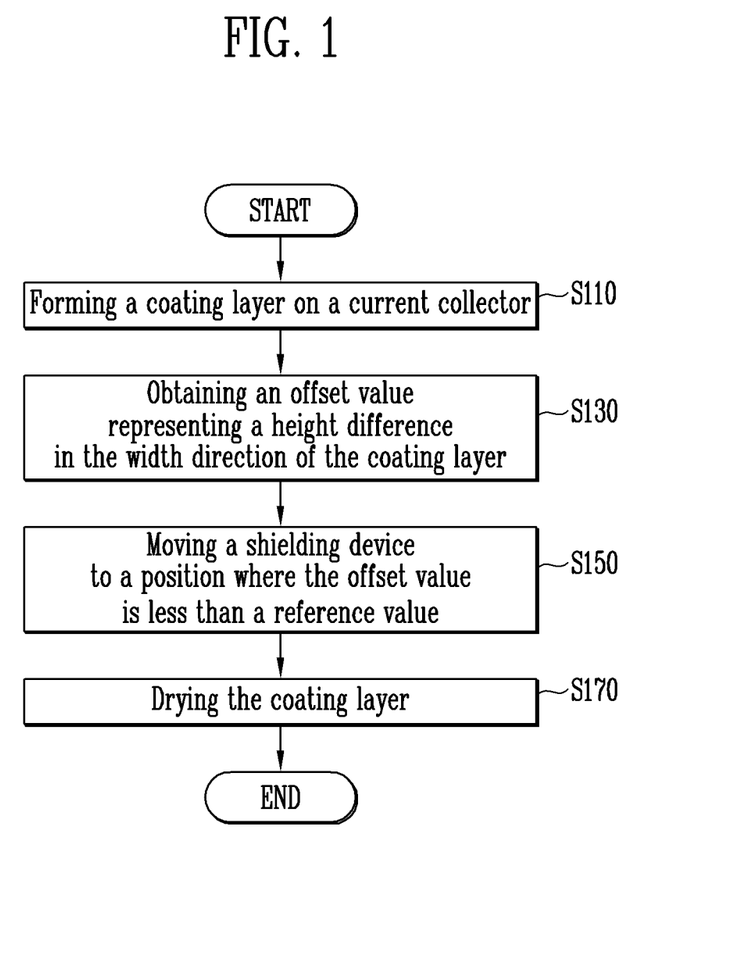
FIG. 1 is a diagram for explaining a manufacturing method of an electrode for secondary battery according to one Example of the present disclosure.

FIG. 1 is a diagram for explaining a manufacturing method of an electrode for secondary battery according to one Example of the present disclosure.

Referring to FIG. 1, a manufacturing method of an electrode for secondary battery may comprise: forming a coating layer on a current collector (S110); obtaining an offset value representing a height difference in the width direction of the coating layer (S130); moving a shielding device to a position where the offset value is less than a reference value (S150); and drying the coating layer (S170).

Specifically, according to the manufacturing method of an electrode for secondary battery, a coating layer may be first formed on a current collector (S110).

In an Example, a current collector may receive electrons from the outside and transfer the electrons to an active material to cause an electrochemical reaction in the active material, or receive electrons from an active material and transfer the electrons to the outside. For example, a current collector may comprise at least one of copper, aluminum, stainless steel, titanium, and nickel. In addition, a current collector may comprise a material such as various metals having high conductivity. A current collector may have a structure such as a foil or a film having the height of several millimeters (mm) or several micrometers (μm).

In one Example, a coating layer may comprise a solvent, an active material, a conductive material, and a binder.

A solvent may disperse an active material, a conductive material, and a binder. For example, a solvent may be distilled water or pure water (DI-water, deionized water).

An active material may be classified into a cathode active material and an anode active material depending on the type. In one Example, a cathode active material may comprise a material in which lithium (Li) ions can be intercalated and deintercalated. For example, a cathode active material may comprise lithium manganese-based oxide, lithium nickel-based oxide, lithium cobalt-based oxide, lithium nickel manganese-based oxide, lithium nickel cobalt manganese-based oxide, lithium nickel cobalt aluminum-based oxide, lithium iron phosphate-based compound, lithium manganese phosphate-based compound, lithium cobalt phosphate-based compound, and lithium vanadium phosphate-based compound. In one Example, an anode active material may be a material in which lithium (Li) ions can be intercalated and deintercalated. For example, an anode active material may comprise at least one of carbon-based materials, such as natural graphite, artificial graphite, crystalline carbon, amorphous carbon, carbon composite, and carbon fibers, lithium alloys, silicon (Si), and tin (Sn).

A conductive material may be a material having electrical conductivity. As a conductive material, any material that does not cause a chemical change and that has electrical conductivity may be used without being particularly limited. For example, a conductive material may comprise at least one of materials of carbon-based materials, such as natural graphite, artificial graphite, carbon nanotubes (CNT), and graphene, metal powders and metal fibers of copper, nickel, aluminum, silver, and the like, or conductive polymers such as polyphenylene derivatives.

A binder may be a material having viscosity for attaching an active material and a conductive material onto a current collector. For example, a binder may be styrene butadiene rubber (SBR), polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), sulfonated-EPDM, fluoro-rubber, or various copolymers thereof, and the like, and one kind alone or a mixture of two or more kinds thereof may be used.

In one Example, a coating layer may be formed by applying a slurry on a current collector. A slurry may be a mixture in which an active material, a conductive material, and a binder are dispersed in a solvent. A coating layer may be formed on one side or both sides of a current collector.

Specifically, a slurry may be applied on a current collector through a coating die. In one Example, a current collector may move in a horizontal direction through the rotation of a roller. For example, a horizontal direction may be the x-axis direction. While a current collector is moving, a coating die may apply a slurry onto a current collector at a preset speed. In this case, a coating layer containing a slurry may be formed on a current collector.

Meanwhile, a coating layer may have a height difference in the width direction. For example, the width direction may be the y-axis direction. A coating layer may be divided into a side area and a central area in the width direction. A central area may be an area located between side areas. Side areas exist in the adjacent areas of a central area. However, since the adjacent areas of the side areas are empty, the height of the side areas may be smaller than the height of the central area. Therefore, a side area is an area where the amount of solvent is smaller than that of a central area. In addition, during a drying process, more heat can be transferred to a side area, because an air flow is greater compared to a central area. As a result, a side area may be dried faster than a central area, and cracks may occur due to over-drying in a side area. In the present disclosure, over-drying or cracking may be prevented by controlling the amount of heat transferred to a side area by using a shielding device.

In addition, an offset value representing a height difference in the width direction of a coating layer may be obtained (S130).

In one Example, the height of a coating layer may be measured through a height sensor. The height of a coating layer can be measured in the width direction. In addition, an offset value may be obtained based on the average height of a central area and the average height of a side area.

In one Example, a ratio of the average height of a central area and the average height of a side area may be obtained as an offset value. In another Example, a difference value between the average height of a central area and the average height of a side area may be obtained as an offset value.

In one Example, measuring the height of a coating layer may comprise outputting light to a coating layer by an output portion of a height sensor, receiving light by a receiving portion of the height sensor, and determining a value corresponding to a position of light received by the receiving portion as the height of the coating layer.

In addition, a shielding device may be moved to a position where an offset value is less than a reference value (S150).

A shielding device is a device for blocking hot air emitted toward a specific area of a coating layer. The shielding device may move along a guide rail. A guide rail represents a moving rail of a shielding device. For example, a shielding device may comprise a shield portion and a wheel portion. A shield portion may block a side area of a nozzle. A wheel portion may be coupled to a guide rail. A shielding device can move through the rotation of wheels or guide rail.

In one Example, moving a shielding device may comprise moving a shielding device along a guide rail so that the shielding device may shield a side area of a selected nozzle corresponding to a position where an offset value is less than a reference value among a plurality of nozzles.

A plurality of nozzles may be disposed along a horizontal direction. Each of the plurality of nozzles may emit hot air. For example, each of the plurality of nozzles may comprise a side area and a central area. A side area of a nozzle may emit hot air to a side area of a coating layer. A central area of a nozzle may emit hot air to a central area of a coating layer.

In one Example, a shielding device may be located at an initial position. Here, an initial position may be a position in which a nozzle is not shielded. Then, when a selected nozzle corresponding to a position where an offset value is less than a reference value is determined among a plurality of nozzles, a shielding device may move to shield a side area of the selected nozzle. In this case, the shielding device may remain at an initial position so as not to shield a nozzle corresponding to a position where an offset value is equal to or greater than a reference value. Here, a reference value may be a preset value. For example, a reference value may be a value in the unit of % or a value in the unit of mm.

In addition, a coating layer may be dried (S170). For example, a coating layer may be dried through convection heat by hot air. Here, hot air may be supplied through a nozzle.

In one Example, while a shielding device shields a side area of a selected nozzle, a coating layer may be dried by hot air supplied through each of nozzles other than the selected nozzle among a plurality of nozzles and by hot air supplied through a central area of the selected nozzle.

In the manufacturing method according to one Example, an offset value may be reobtained while drying a coating layer. In this case, a shielding device may be moved to a position where a reobtained offset value is less than a reference value. This is because the height difference between a central area and a side area of a coating layer may change due to drying of a solvent.

According to one Example of the present disclosure, an electrode for secondary battery manufactured according to the manufacturing method of an electrode for secondary battery may be provided.

Figure 2:
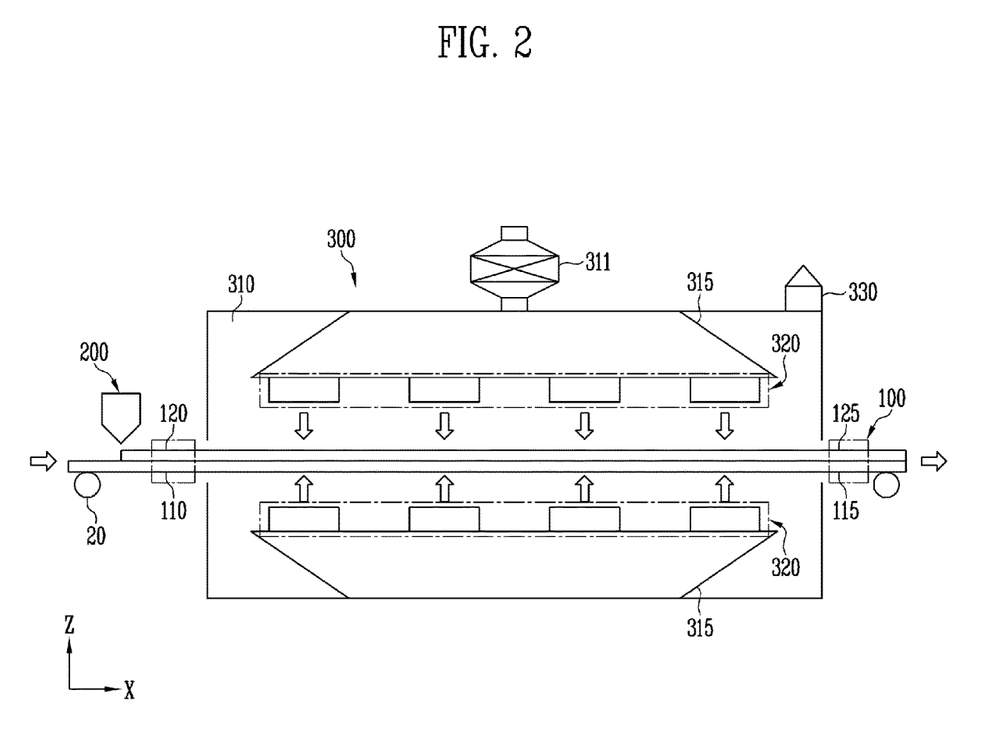
FIG. 2 is a diagram for explaining a manufacturing apparatus of an electrode for secondary battery according to one Example of the present disclosure.

FIG. 2 is a diagram for explaining a manufacturing apparatus of an electrode for secondary battery according to one Example of the present disclosure.

Referring to FIG. 2, a current collector 110 may be moved in a horizontal direction by the rotation of a roller 20. For example, a horizontal direction may be the x-axis direction. A coating die 200 may apply a slurry on a moving current collector 110 to form a coating layer 120 comprising a slurry on a current collector 110. Here, an electrode may comprise a current collector 110 and a coating layer 120. An electrode may move in a horizontal direction and enter the inside of a manufacturing apparatus 300.

A manufacturing apparatus of an electrode for secondary battery 300 according to an Example of the present disclosure may comprise a drying chamber 310, a hot air supply portion 311, a trunk 315, a plurality of nozzles 320, and an exhaust port 330.

A drying chamber 310 represents a space for accommodating an electrode. In one Example, a drying chamber 310 may comprise a plurality of areas. An electrode may sequentially pass through a plurality of areas. A partition wall may exist between individual areas. Each area may comprise a nozzle located above an electrode and a nozzle located under an electrode.

A hot air supply portion 311 is a device that supplies hot air for manufacturing an electrode 100 for secondary battery by drying an electrode. To this end, a hot air supply portion 311 may comprise a boiler and a circulation fan. A boiler may be a heating device using a heat transfer fluid. A heat transfer fluid is a fluid other than steam or water and may be a material having a high heat transfer coefficient at a high temperature. A boiler may generate high-temperature hot air by heating air by using a heat transfer fluid. A circulating fan may generate an air flow. For example, a circulating fan may comprise a motor and rotary blades. When the rotational force of a motor is transmitted to rotary blades, an air flow can be generated through the rotation of rotary blades.

A hot air supply portion 311 may be connected to a plurality of nozzles 320 through a trunk 315. A trunk 315 is a device distributing hot air from a hot air supply portion 311 to a plurality of nozzles 320. For example, a trunk 315 may be implemented as a pipe or the like.

Each of a plurality of nozzles 320 may supply hot air to an electrode comprising a current collector 110 and a coating layer 120 formed on the current collector 110. To this end, each of a plurality of nozzles 320 may be connected to a trunk 315.

A plurality of nozzles 320 may comprise upper nozzles and lower nozzles. Here, upper nozzle may be nozzles disposed above an electrode, and lower nozzles may be nozzles disposed under an electrode. Each of upper nozzles and the lower nozzles may be disposed in a horizontal direction. Here, a horizontal direction may be a direction in which an electrode moves. For example, a horizontal direction may be the x-axis direction.

Each of a plurality of nozzles 320 may comprise a side discharge portion and a central discharge portion. A side area of a nozzle 320 may emit hot air toward a side area of an electrode, and a central area of a nozzle 320 may emit hot air toward a central area of an electrode.

In one Example, at least one of a plurality of nozzles 320 may be a Coanda nozzle. A Coanda nozzle may be a nozzle that accelerates a flow of hot air through a diameter difference between an inflow portion and a discharge portion or a streamlined structure a streamlined structure or a difference in diameter between an inflow portion and a discharge portion. However, this is only an Example, and the type of nozzle may be variously modified and implemented.

An exhaust port 330 may be connected to the outside of a manufacturing apparatus 300. For example, hot air supplied into a drying chamber 310 through a nozzle 320 may be discharged to the outside of a drying chamber 310 through an exhaust port 330 after heat exchange with an electrode.

A manufacturing apparatus 300 can manufacture an electrode 100 for secondary battery by drying an electrode. An electrode 100 for secondary battery may comprise a dried current collector 115 and a dried coating layer 125. A dried coating layer 125 represents a state in which a solvent is removed from a coating layer 120.

A manufacturing apparatus of an electrode for secondary battery 300 according to an Example of the present disclosure may further comprise a height sensor, a shielding device, and a guide rail. A manufacturing apparatus 300 of the present disclosure may move a shielding device to a position where the height difference of a coating layer 120 is less than a reference value and dry an electrode in a state in which a selected nozzle corresponding to the position is shielded by a shielding device. Accordingly, over-drying or cracking of a local area (e.g., a side area) of a coating layer 120 may be prevented. A more detailed description will be described with reference to the accompanying drawings.

Figure 3A:
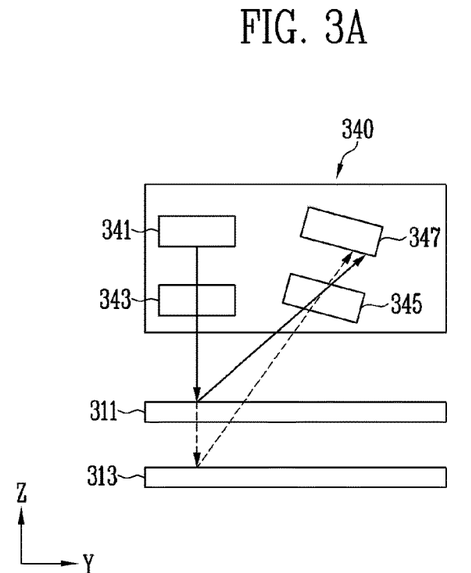
FIG. 3A and FIG. 3B is a diagram for explaining a height sensor according to one Example of the present disclosure.
Figure 3B:
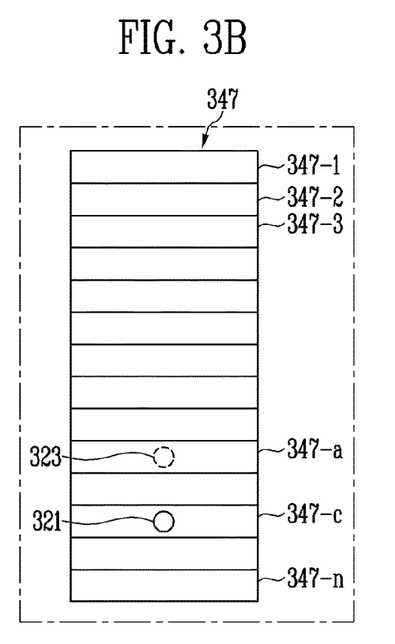

FIG. 3A and FIG. 3B is a diagram for explaining a height sensor according to one Example of the present disclosure.

Referring to FIG. 3A, a height sensor 340 may measure the height of coating layers 311, 313. For example, the y-axis represents the width direction and the z-axis represents the height.

Specifically, the height sensor 340 may measure the distance to coating layers 311, 313 and convert the measured distance into the height of the coating layers 311, 313. For example, a height sensor 340 may measure the distance between the height sensor 340 and coating layers 311, 313 and obtain a value obtained by subtracting the measured distance from a reference distance as a height of the coating layers 311, 313. A reference distance may be the distance between a height sensor 340 and a current collector on which coating layers 311, 313 are not formed, or may be a value measured in advance by a height sensor 340.

In one Example, a height sensor 340 may comprise an output portion 341, a light transmission lens 343, a light receiving lens 345, and a receiving portion 347. For example, a height sensor 340 may be a laser sensor using triangulation but this is only an example, and a height sensor 340 may be modified into various types of sensors such as a Time of Flight (ToF) camera.

The output portion 341 may output light to coating layers 311, 313. Here, light may be various types of light signals such as laser pulse, infrared ray, and visible ray. A light transmission lens 343 may be disposed to be located in a light progress direction. Light may pass through a light transmission lens 343 and be reflected on a surface of coating layers 311, 313. The receiving portion 347 may receive reflected light. For example, reflected light may pass through a light receiving lens 345 and reach a receiving portion 347.

A receiving portion 347 may determine a value corresponding to the position of received light as a height of coating layers 311, 313.

Referring to FIG. 3B, a receiving portion 347 may comprise a plurality of light receiving elements 347-1 to 347-n. Light receiving elements 347-1 to 347-n may receive light and convert the same into an electrical signal. Light receiving elements 347-1 to 347-n may be arranged in rows or columns. Depending on the positions of light receiving elements 347-1 to 347-n that have received light, the distance to an inspection target can be measured. Here, an inspection target may be coating layers 311, 313.

A corresponding value may be pre-mapped to each of light receiving elements 347-1 to 347-n. For example, as values corresponding to light receiving elements 347-1 to 347-n, a larger value may be mapped to a light receiving element closer a first light receiving element 347-1, and a smaller value may be mapped to a light receiving element closer an n-th light receiving element 347-n.

For example, referring to FIG. 3A and FIG. 3B, a solid arrow indicates a light path for a first coating layer 311, and a dotted arrow indicates a light path for a second coating layer 313. In other words, a solid arrow may indicate a case in which the height of a coating layer having a larger height is measured, and a dotted arrow may indicate a case in which the height of a coating layer having a smaller height is measured.

An a-th light receiving element 347-a may receive light 323 reflected from a second coating layer 313. In addition, a receiving portion 347 may obtain a value mapped to a c-th light receiving element 347-c that has reflected the light 323 as the distance from a second coating layer 313. In addition, a receiving portion 347 may determine a value obtained by subtracting the measured distance from a reference distance as the height of a second coating layer 313.

A c-th light receiving element 347-c may receive light 321 reflected from a first coating layer 311. In addition, a receiving portion 347 may obtain a value mapped to a c-th light receiving element 347-a that has reflected the light 321 as the distance from a first coating layer 311. In addition, a receiving portion 347 may determine a value obtained by subtracting the measured distance from a reference distance as the height of a first coating layer 311.

Here, the distance from a second coating layer 313 may be greater than the distance from a first coating layer 311. Therefore, the height of a second coating layer 313 may be measured as a smaller value than the height of a first coating layer 311.

Figure 4:
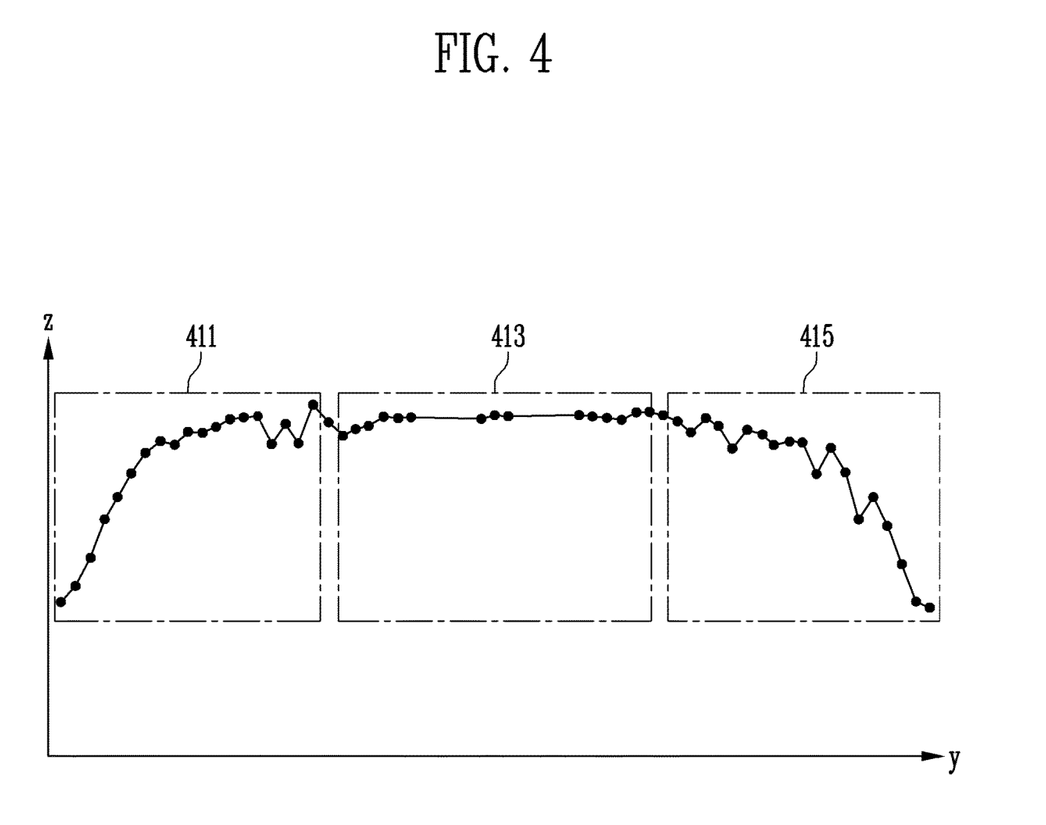
FIG. 4 is a diagram for explaining the height in the width direction according to one Example of the present disclosure.

FIG. 4 is a diagram for explaining the height in the width direction according to one Example of the present disclosure.

Referring to FIG. 4, the height of a coating layer in the width direction measured by a height sensor 340 according to an Example of the present disclosure is shown. Here, the y-axis represents the position in the width direction, and the z-axis represents the height.

The coating layer may be divided into side areas 411, 415 and a central area 413 in the width direction. A central area 413 may be an area located between side areas 411, 415. Side areas 411, 415 and a central area 413 may be defined by preset sections. For example, when the width of a coating layer is 90 mm, a first side area 411 is an area corresponding to a range from 0 mm or more to less than 30 mm, a central area 413 is an area corresponding to a range from 30 mm or more to less than 60 mm, and a second side area 415 may be an area corresponding to a range from 60 mm or more and 90 mm or less. As another example, side areas 411, 415 may be defined as a range in which a change in the height is greater than or equal to a reference value, and a central area 413 may be defined as a range in which a change in the height is less than a reference value. The height of a central area 413 may have a uniform value compared to the height of side areas 411, 415.

In one Example, a height sensor 340 may obtain an offset value. Here, an offset value may be a value representing a difference between the height of a central area 413 and the height of side areas 411, 415.

In one Example, a height sensor 340 may obtain an offset value based on the average height of a central area 413 and the average height of side areas 411, 415.

In one Example, a height sensor 340 may obtain a ratio value of the average height of a central area 413 and the average height of side areas 411, 415 as an offset value. In one Example, a height sensor 340 may obtain a difference value between the average height of a central area 413 and the average height of side areas 411, 415 as an offset value.

A height sensor 340 may obtain an offset value for each position in a horizontal direction. Here, a horizontal direction may be the x-axis direction. Therefore, a height sensor 340 may obtain a plurality of offset values. Each offset value may correspond to a specific position in a horizontal direction.

Figure 5:
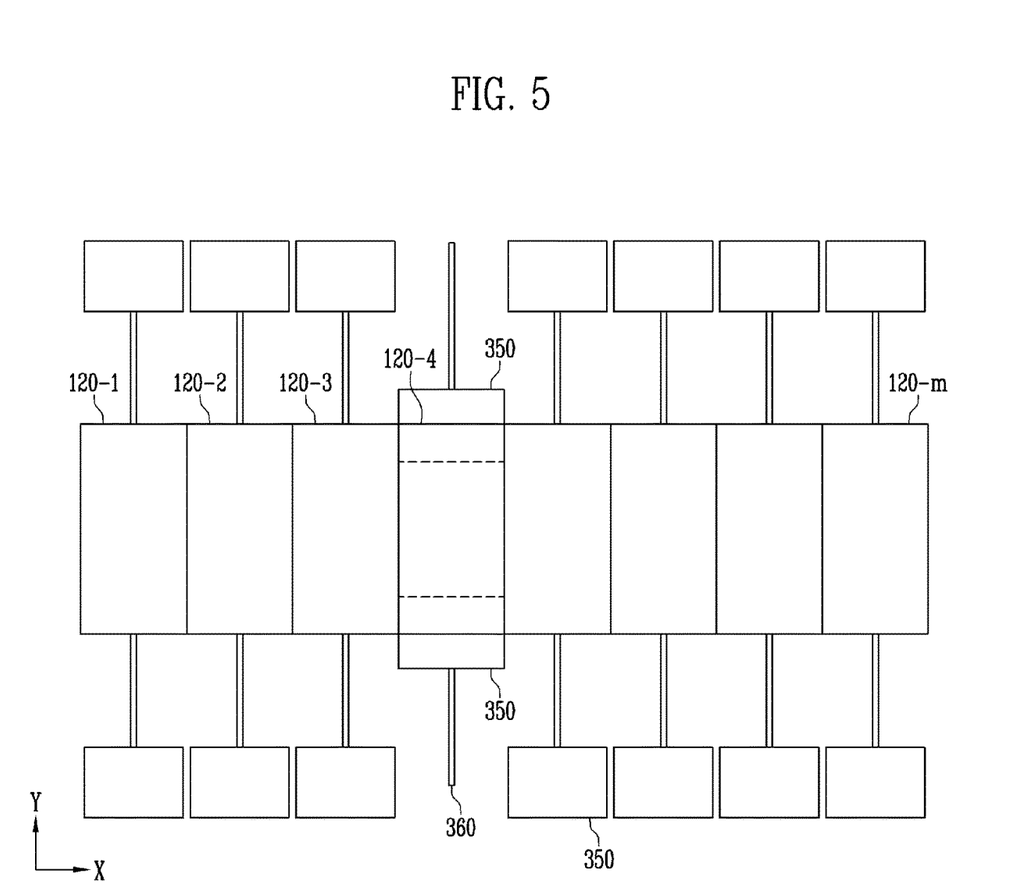
FIG. 5 is a diagram for explaining a shielding device according to one Example of the present disclosure.

FIG. 5 is a diagram for explaining a shielding device according to one Example of the present disclosure.

Referring to FIG. 5, a coating layer may be divided into a plurality of areas according to the position in a horizontal direction. Here, a horizontal direction may be the x-axis direction. For example, a coating layer may be divided into a first area 120-1 to an m-th area **120-*m*. A shielding device 350 and a guide rail 360 may be disposed above or under each area 120-1 to 120-*m*** of a coating layer.

A shielding device 350 may move along a guide rail 360. For example, a shielding device 350 may move along the width direction of a coating layer. Here, a width direction may be the y-axis direction. Shielding devices 350 corresponding to each area 120-1 to **120-*m* of a coating layer may be mapped. A shielding device 350** may be disposed between a nozzle and an electrode to block a side area of a nozzle.

According to an Example, a manufacturing apparatus 300 may further comprise a controller. A controller is a device capable of controlling the overall configuration of a manufacturing device 300 or calculating data. For example, a controller may be a computer, a central processing unit (CPU), a logic circuit, or the like. A controller may control the movement of a shielding device 350 based on the data of a height sensor 340.

The controller may determine a position where an offset value is less than a reference value. Specifically, a controller may compare each of a plurality of offset values with a reference value to identify an offset value less than a reference value. Here, a reference value may be a preset value. For example, a reference value may be a value in the unit of % or a value in the unit of mm. In addition, a controller may identify a position corresponding to an identified offset value. A controller may move a shielding device 350 that is mapped to an identified location.

For example, assuming that an offset value of a fourth area 120-4 among a plurality of areas 120-1 to **120-*m* of a coating layer is less than a reference value, a controller may identify the position (or area) in a horizontal direction corresponding to an offset value of a fourth area 120-4. In addition, a controller may control a shielding device 350 mapped to an identified position (or area) to move from an initial position to a preset location. An initial position may be a position where a shielding device 350 is set not to shield a nozzle. A preset position may be a position where a shielding device 350 is set to shield a side area of a nozzle. Here, in the case of a position having an offset value equal to or greater than a reference value, a controller may control a shielding device 350** that is mapped to the position to remain at an initial position.

Meanwhile, the controller described above has been described as being included inside a manufacturing apparatus 300 but this is only an example, and a controller may be implemented as an external device of a manufacturing apparatus 300.

Figure 6:
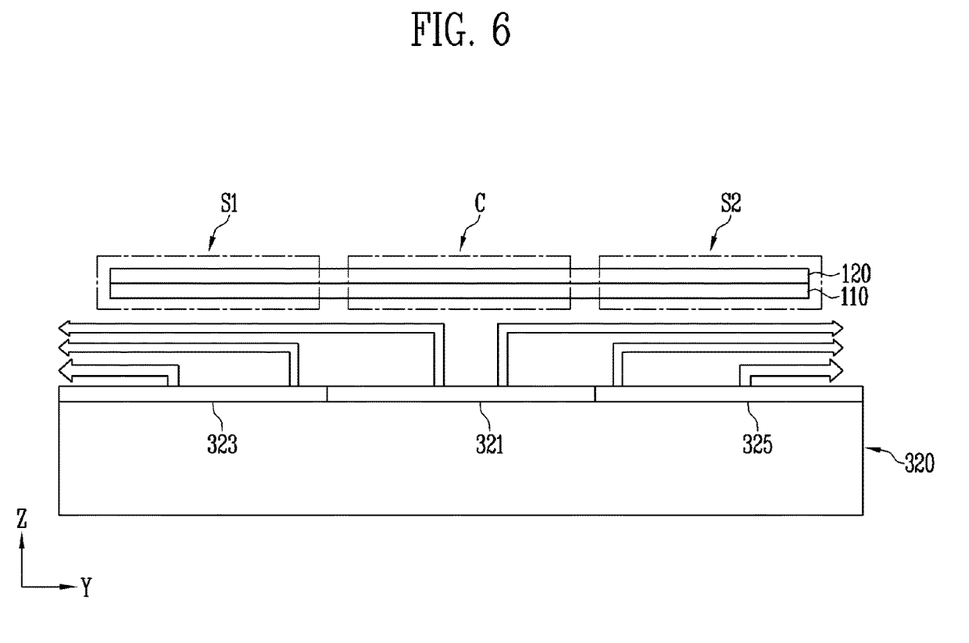
FIG. 6 is a diagram for explaining a nozzle according to one Example of the present disclosure.

FIG. 6 is a diagram for explaining a nozzle according to one Example of the present disclosure.

Referring to FIG. 6, an electrode according to an Example of the present disclosure may comprise a current collector 110 and a coating layer 120. An electrode may be divided into side areas S1, S2 and a central area C according to the width direction. Here, the width direction may be the y-axis direction, and the height direction may be the z-axis direction. FIG. 6 shows a case where a shielding device 350 does not shield a nozzle 320. In other words, FIG. 6 shows a cross-section of a position where a height difference between side areas S1, S2 and a central area C is equal to or greater than a reference value.

According to one Example, a nozzle 320 may be disposed under an electrode. A nozzle 320 may comprise side areas 323, 325 and a central area 321.

Side areas 323, 325 of a nozzle 320 may emit hot air toward side areas S1, S2 of a coating layer 120. In this case, the emitted hot air may move to a left end or a right end after heat exchange with side areas S1, S2 of a coating layer 120.

A central area 321 of a nozzle 320 may emit hot air toward a central area C of a coating layer 120. In this case, the emitted hot air may pass through a central are C of a coating layer 120 and exchange heat with side areas S1, S2 and then move to a left end or a right end.

Meanwhile, the nozzle 320 described above has been described as being disposed under an electrode but this is only one Example, and a single nozzle 320 may be disposed above an electrode or two nozzles 320 may be disposed above and under an electrode.

Figure 7:
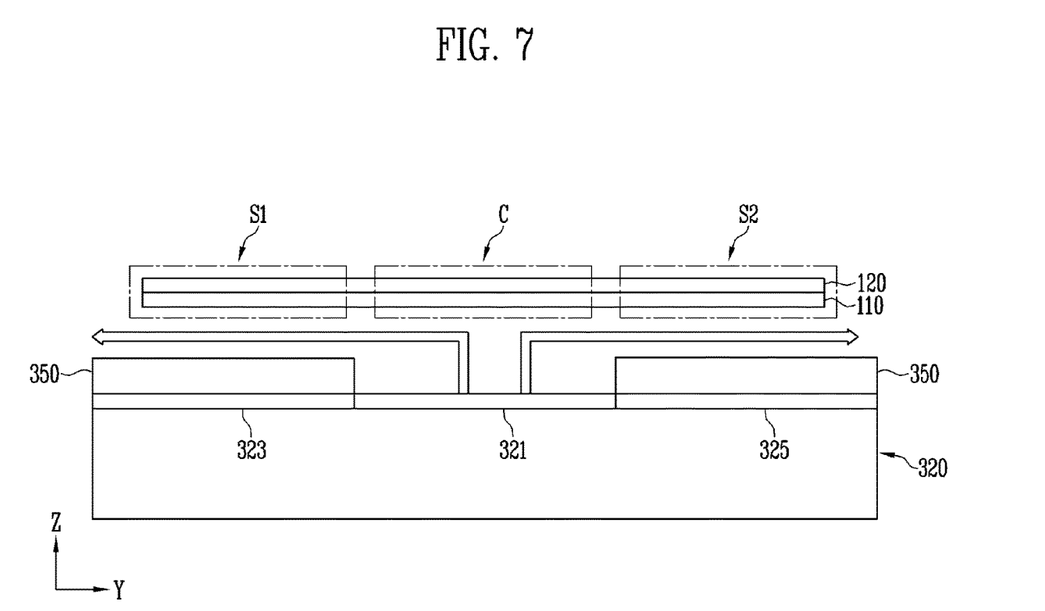
FIG. 7 is a diagram for explaining a nozzle and a shielding device according to one Example of the present disclosure.

FIG. 7 is a diagram for explaining a nozzle and a shielding device according to one Example of the present disclosure.

Referring to FIG. 7, an electrode according to an Example of the present disclosure comprises a current collector 110 and a coating layer 120, wherein the electrode may be divided into side areas S1, S2 and a central area C along the width direction. FIG. 7 shows a case where a shielding device 350 does not shield a nozzle 320. In other words, FIG. 7 shows a cross-section of a position where a height difference between side areas S1, S2 and a central area C less than a reference value.

According to one Example, a nozzle 320 may be disposed under an electrode. A nozzle 320 may comprise side areas 323, 325 and a central area 321.

Side areas 323, 325 of a nozzle 320 may be shielded by a shielding device 350. Therefore, a shielding device 350 may shield side areas 323, 325 of a nozzle 320 corresponding to a position where an offset value is less than a reference value among a plurality of nozzles. In this case, the supply of hot air through side areas 323, 325 of a nozzle 320 may be blocked.

A central area 321 of a nozzle 320 may emit hot air toward a central area C of a coating layer 120. In this case, the emitted hot air may exchange heat with a central area C of a coating layer 120 and then exchange heat with side areas S1, S2 of a coating layer 120.

Meanwhile, the nozzle 320 described above has been described as being disposed under an electrode but this is only one Example, and a single nozzle 320 may be disposed above an electrode or two nozzles 320 may be disposed above and under an electrode. In this case, the position and number of shielding devices 350 may be variously modified.

In one Example, a height sensor 340 may reobtain an offset value while drying a coating layer 120. This is because a height change may occur during a drying process of a coating layer 120. When a reobtained offset value is less than a reference value, a shielding device 350 may move along a guide rail 360 to a position where the reacquired offset value is less than a reference value.

As described above, according to the present disclosure, hot air directed emitted toward side areas S1, S2 of a coating layer 120 may be blocked by using a shielding device 350 to control the amount of heat and air transmitted to side areas S1, S2 of a coating layer 120 may be controlled. Accordingly, there is a technical effect of reducing a difference in a drying speed between a central area C and side areas S1, S2 of a coating layer 120.

What is claimed is:

1. A manufacturing apparatus of an electrode for secondary battery comprising:
   a plurality of nozzles for supplying hot air to an electrode comprising a current collector and a coating layer formed on the current collector;
   a height sensor obtaining an offset value representing a height difference of the coating layer in the width direction; and
   a shielding device formed by a plate-shaped member comprising one side facing the electrode moving, along a guide rail, to a position where the offset value is less than a reference value,
   wherein the height sensor reobtains the offset value while drying the coating layer, and
   wherein the shielding device moves, along the guide rail, to a position where the reobtained offset value is less than the reference value,
   wherein the height sensor comprises an output portion, a light transmission lens, a light receiving lens, and a receiving portion,
   wherein the output portion outputs light to coating layers,
   wherein the receiving portion determines a value corresponding to a position of received light as a height of the coating layers, and
   wherein the receiving portion comprises a plurality of light receiving elements, the plurality of light receiving elements receive light and convert the light into an electrical signal.

2. The manufacturing apparatus of an electrode for secondary battery according to claim 1, wherein the shielding device shields a side area of a selected nozzle corresponding to a position where the offset value is less than a reference value among a plurality of nozzles.

3. The manufacturing apparatus of an electrode for secondary battery according to claim 1, wherein the plurality of nozzles are disposed along a horizontal direction under or above the electrode, and the shielding device moves between the plurality of nozzles and the electrode.

4. The manufacturing apparatus of an electrode for secondary battery according to claim 1, wherein the height sensor measures the height of the coating layer and obtains the offset value based on an average height of a central area in the width direction of the coating layer and an average height of a side area in the width direction of the coating layer.

5. The manufacturing apparatus of an electrode for secondary battery according to claim 4, wherein the height sensor obtains a ratio value or a difference value between the average height of the central area in the width direction of the coating layer and the average height of the side area in the width direction of the coating layer as the offset value.

* * * * *